(12) United States Patent
Hung

(10) Patent No.: US 6,854,425 B1
(45) Date of Patent: Feb. 15, 2005

(54) PET HOUSE

(76) Inventor: Chih-Wen Hung, No. 35 Lane 299, Ching Kuo Road, Ta Chia Town, Taichung Hsien (TW)

( * ) Notice: Subject to any disclaimer, the term of this patent is extended or adjusted under 35 U.S.C. 154(b) by 0 days.

(21) Appl. No.: 10/642,307

(22) Filed: Aug. 14, 2003

(51) Int. Cl.[7] ............................. A01K 1/02; A01K 1/03
(52) U.S. Cl. ...................................... 119/498; 119/500
(58) Field of Search ................................ 119/498, 500, 119/501; D30/108, 109, 112

(56) References Cited

U.S. PATENT DOCUMENTS

| | | | | |
|---|---|---|---|---|
| 5,081,956 A | * | 1/1992 | Greitzer et al. | 119/500 |
| 5,121,710 A | * | 6/1992 | Gonzalez | 119/498 |
| 5,400,743 A | * | 3/1995 | Buckley | 119/498 |
| 5,582,135 A | * | 12/1996 | Bellows | 119/498 |
| 5,964,190 A | * | 10/1999 | Willinger et al. | 119/500 |
| D420,470 S | * | 2/2000 | Kolozsvari et al. | D30/108 |
| 6,092,488 A | * | 7/2000 | Allawas | 119/498 |

FOREIGN PATENT DOCUMENTS

GB          2241144 A  *  9/1991  ............ A01K/1/03

* cited by examiner

Primary Examiner—Teri P. Luu
Assistant Examiner—Elizabeth Shaw
(74) Attorney, Agent, or Firm—Charles E. Baxley

(57) ABSTRACT

A pet house made of paper includes a house-shaped box, at least one reinforcement device and a roof. The house-shaped box includes a front wall defining a door, a rear wall and two lateral walls. The front and rear walls both include an upper portion extending above the lateral walls. The reinforcement device is mounted on the lateral walls. The roof is mounted on the upper portions of the front and rear walls and the reinforcement device.

8 Claims, 9 Drawing Sheets

US 6,854,425 B1

PET HOUSE

FIELD OF INVENTION

The present invention relates to a pet house made of paper.

BACKGROUND OF INVENTION

Referring to FIG. 10, a conventional pet house made of paper includes a house-shaped box 90 and a roof 92. The house-shaped box 90 includes a front wall 93, a rear wall 94 and two lateral walls 95. The front wall 93 defines a door 96. Each of the lateral walls 95 defines a plurality of windows 91. The front wall 93 and the rear wall 94 both include a triangular upper portion on which the roof 92 is mounted. However, as shown, the roof 92 is very likely to deform because of its own weight and lack of support in the middle.

The present invention is therefore intended to obviate or at least alleviate the problems encountered in prior art.

SUMMARY OF INVENTION

It is the primary objective of the present invention to provide a robust pet house made of paper.

According to the present invention, a pet house made of paper includes a house-shaped box, at least one reinforcement device and a roof. The house-shaped box includes a front wall defining a door, a rear wall and two lateral walls. The front and rear walls both include an upper portion extending above the lateral walls. The reinforcement device is mounted on the lateral walls. The roof is mounted on the upper portions of the front and rear walls and the reinforcement device.

Other objects, advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
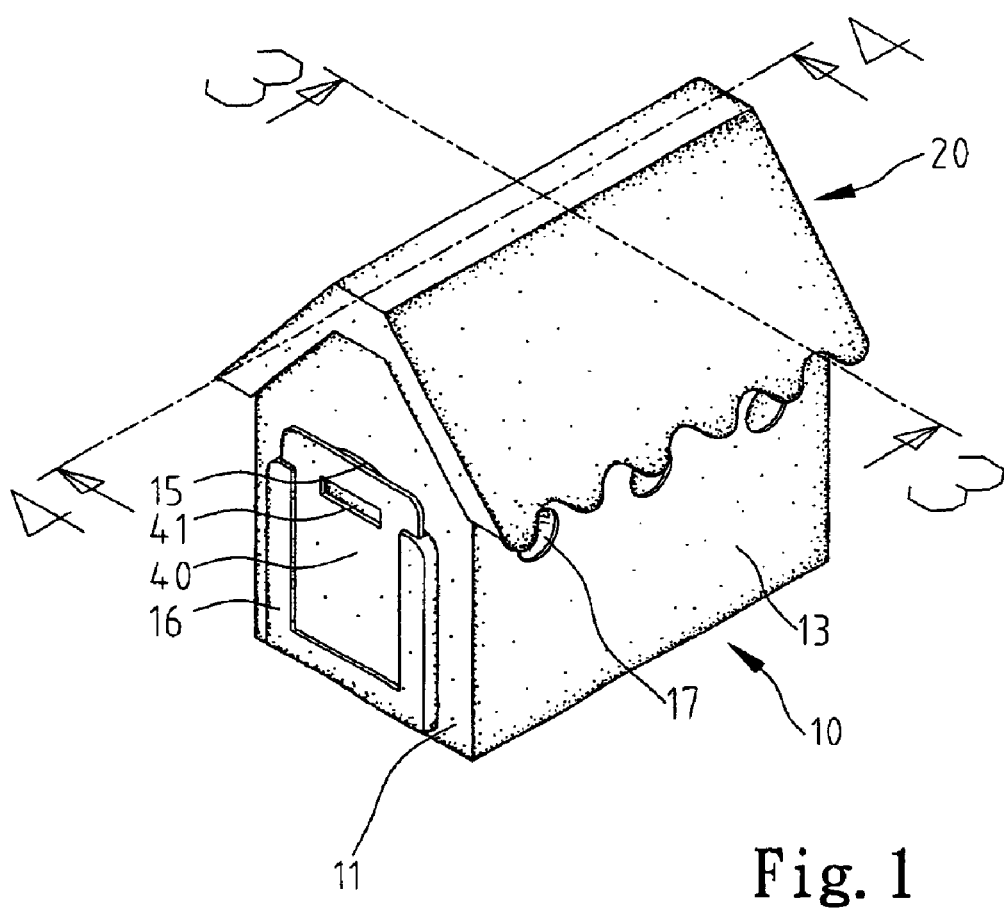
FIG. 1 is a perspective view of a pet house made of paper according to a first embodiment of the present invention.

Referring to FIG. 1, according to a first embodiment of the present invention, a pet house made of paper includes a house-shaped box 10 and a roof 20.

Figure 2:
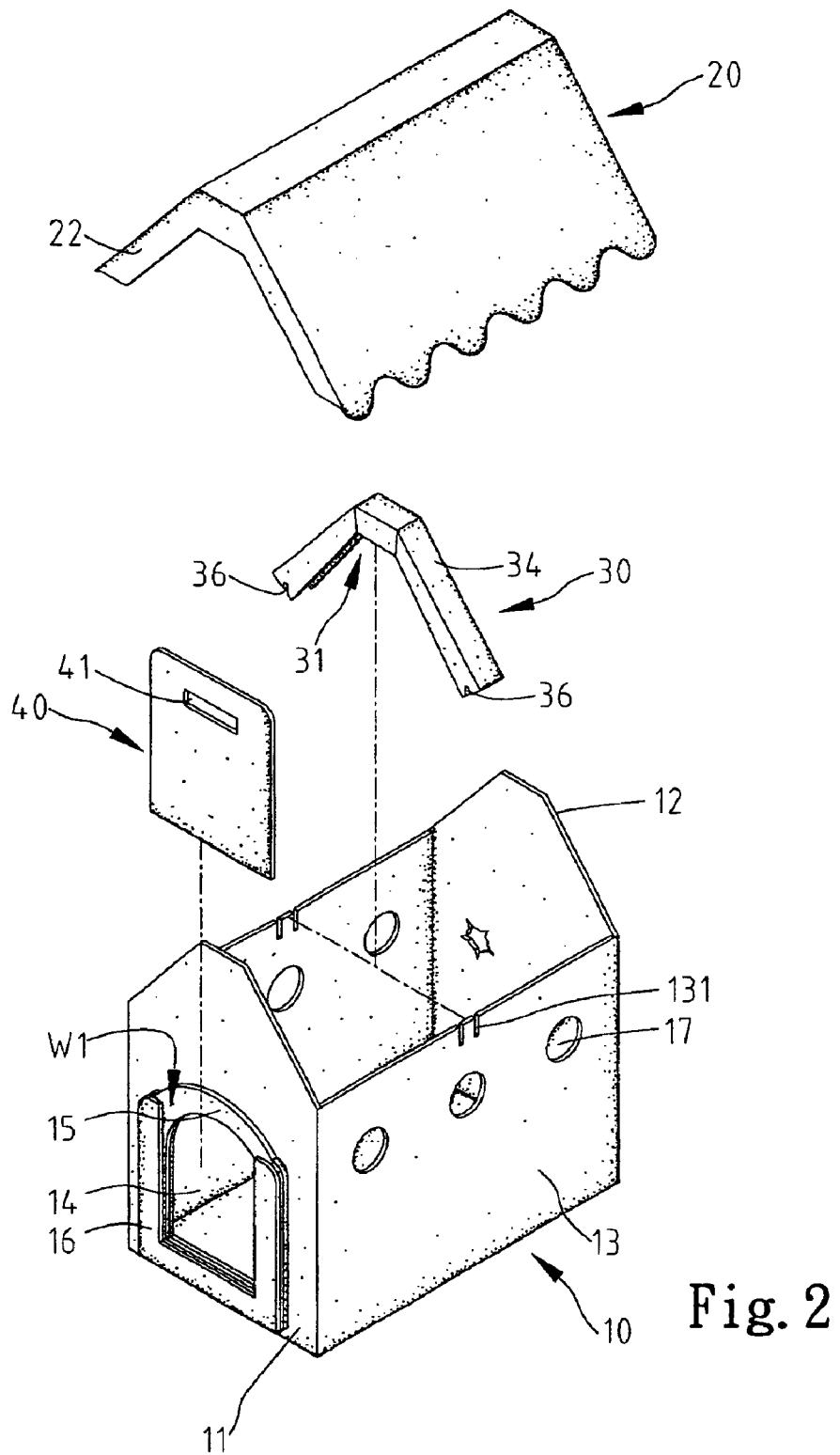
FIG. 2 is an exploded view of the pet house of FIG. 1.
Figure 3:
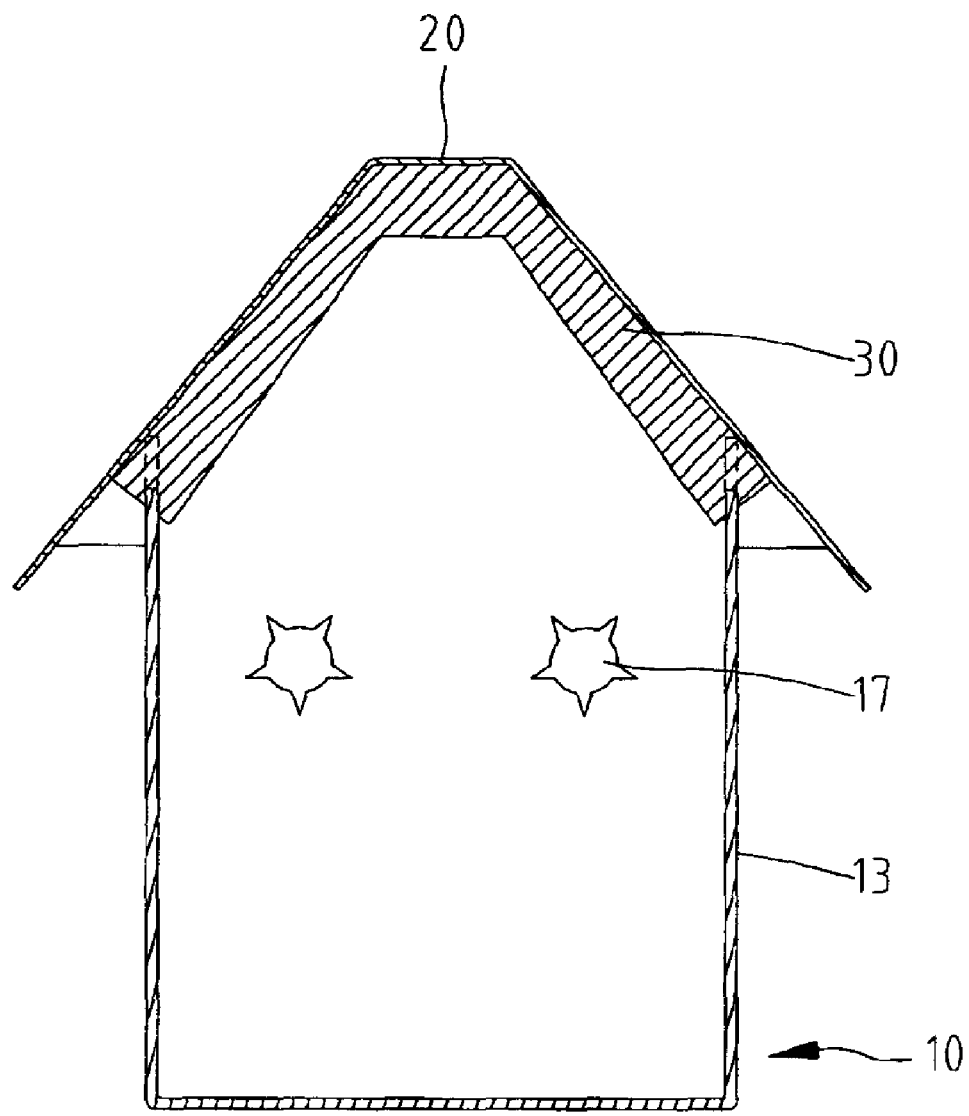
FIG. 3 is a cross-sectional view taken alone a line 3—3 in FIG. 1.

Referring to FIG. 2, the box 10 includes a front wall 11, a rear wall 12 and two lateral walls 13. The front wall 11 and the rear wall 12 both extend above the lateral walls 13 so as to support the roof 20. The front wall 11 defines a door 14. Each lateral wall 13 includes a plurality of windows 17 defined therein.

An arched spacer 15 is attached to the front wall 11 around the door 14. A U-shaped frame 16 is attached to the front wall 11. Between the arched spacer 15 and the U-shaped frame 16 is defined a space W1 for receiving a shutter 40 for shutting the door 14. The shutter 40 defines a slot 41 so as to facilitate operation thereof.

Figure 4:
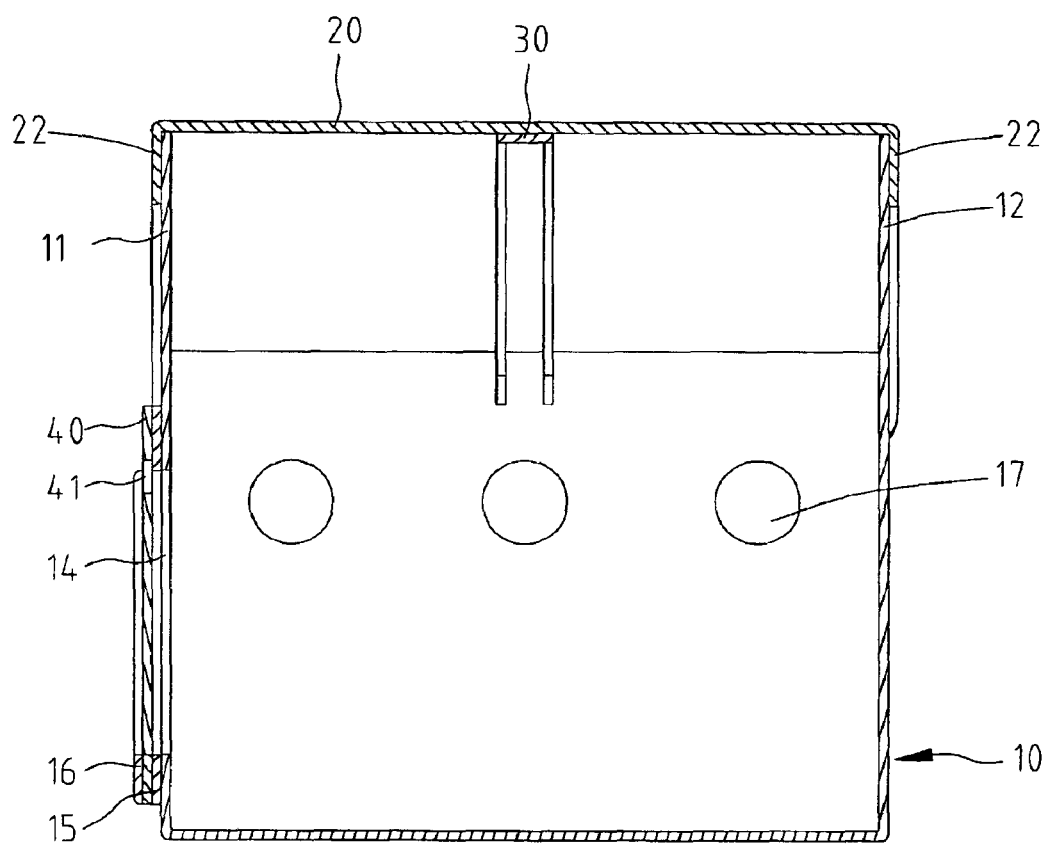
FIG. 4 is a cross-sectional view taken alone a line 4—4 in FIG. 1.

The roof 20 includes two ribs 22 attached thereto so as to enhance its rigidity. The roof 20 is put on the front wall 11 and the rear wall 12. Referring to FIG. 4, the ribs 22 are outside the box 10. The spacer 15 is at least as thick as the ribs 22. Thus, the spacer 15 keeps the shutter 40 from front one of the ribs 22. Hence, smooth operation of the shutter 40 is ensured.

To prevent the roof 20 from deforming because of its own weight, a reinforcement device 30 is used between the box 10 and the roof 20. In detail, the roof 20 is supported on the reinforcement device 30, and the reinforcement device 30 is installed on the lateral walls 13.

Figure 5:
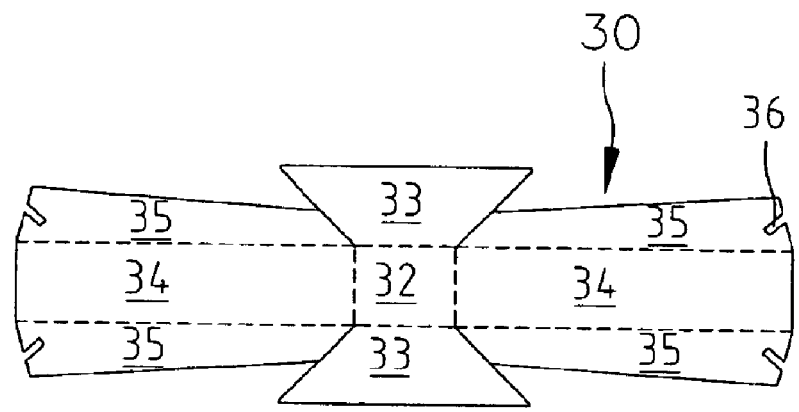
FIG. 5 shows a paperboard of which a reinforcement device of the pet house of FIG. 2 is made.

FIG. 5 shows a paperboard of which the reinforcement device 30 is made. The paperboard includes a central rectangular strip 32, two connectors 33 extending from two sides of the central rectangular strip 32 and two lateral rectangular strips 34 extending from the other sides of the central rectangular strip 32. Each lateral rectangular strip 34 includes two flanks 35 each defining a slit 36.

To form the reinforcement device 30, the connectors 33 are folded towards each other. The lateral rectangular strips 34 are folded towards each other until they contact the connectors 33. The flanks 35 of each lateral rectangular strip 34 are moved towards each other until they contact the connectors 33. Each flank 35 of each lateral rectangular strip 34 is adhered to one connector 33. Thus, the reinforcement device 30 is formed. One connector 33 and two flanks 35 make a rib 31 as shown in FIG. 2.

Referring to FIG. 2, the slits 36 receive the lateral walls 13. Each lateral wall 13 defines two slits 131 for receiving the ribs 31. Thus, the reinforcement device 30 is kept on the lateral walls 13.

Figure 6:
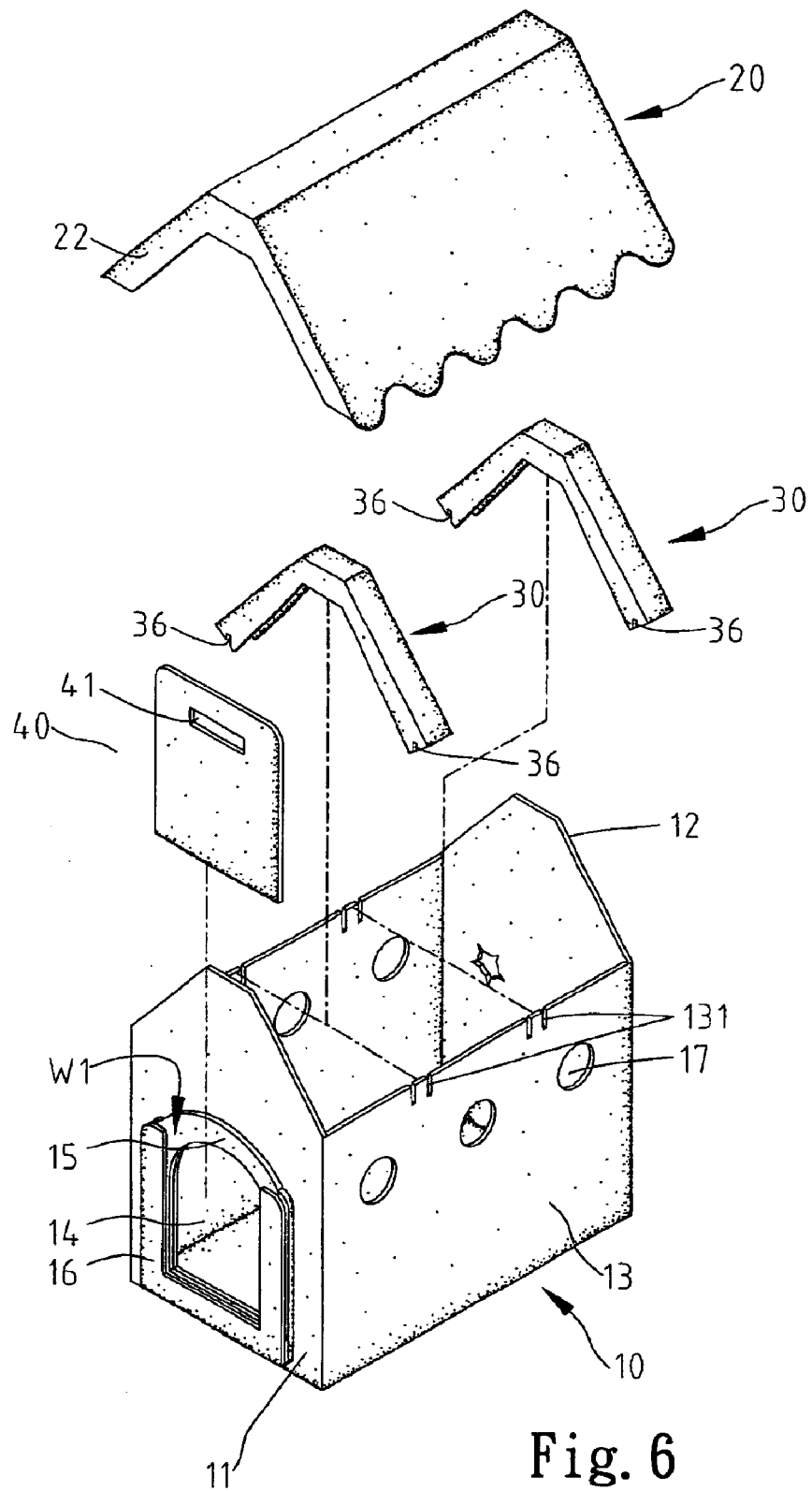
FIG. 6 is an exploded view of a pet house made of paper according to a second embodiment of the present invention.

FIG. 6 shows a pet house made of paper according to a second embodiment of the present invention. The second embodiment is identical to the first embodiment except for including two reinforcement devices 30 instead of one.

Figure 9:
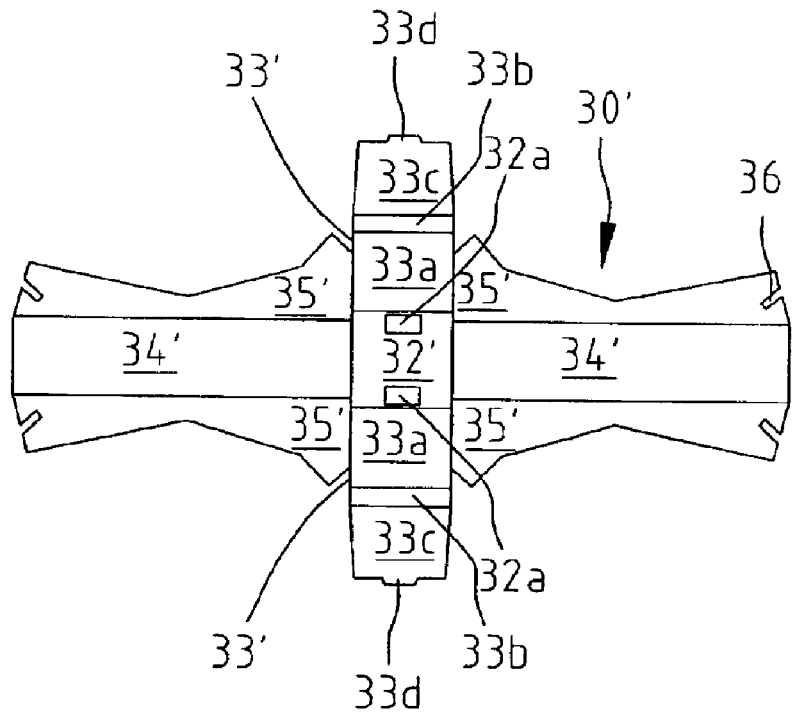
FIG. 9 shows a paperboard of which a reinforcement device of the pet house of FIG. 7 is made.
Figure 7:
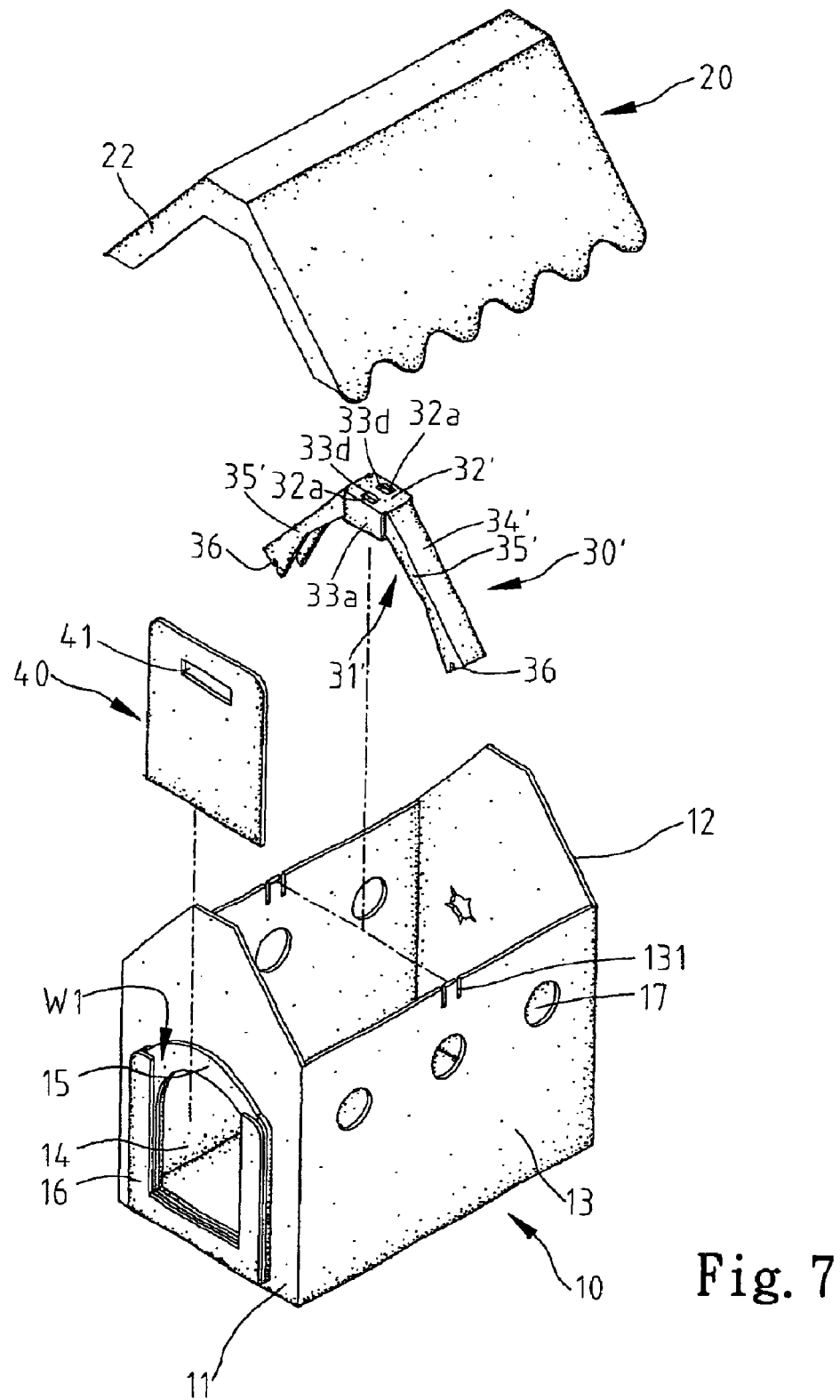
FIG. 7 is an exploded view of a pet house made of paper according to a third embodiment of the present invention.
Figure 8:
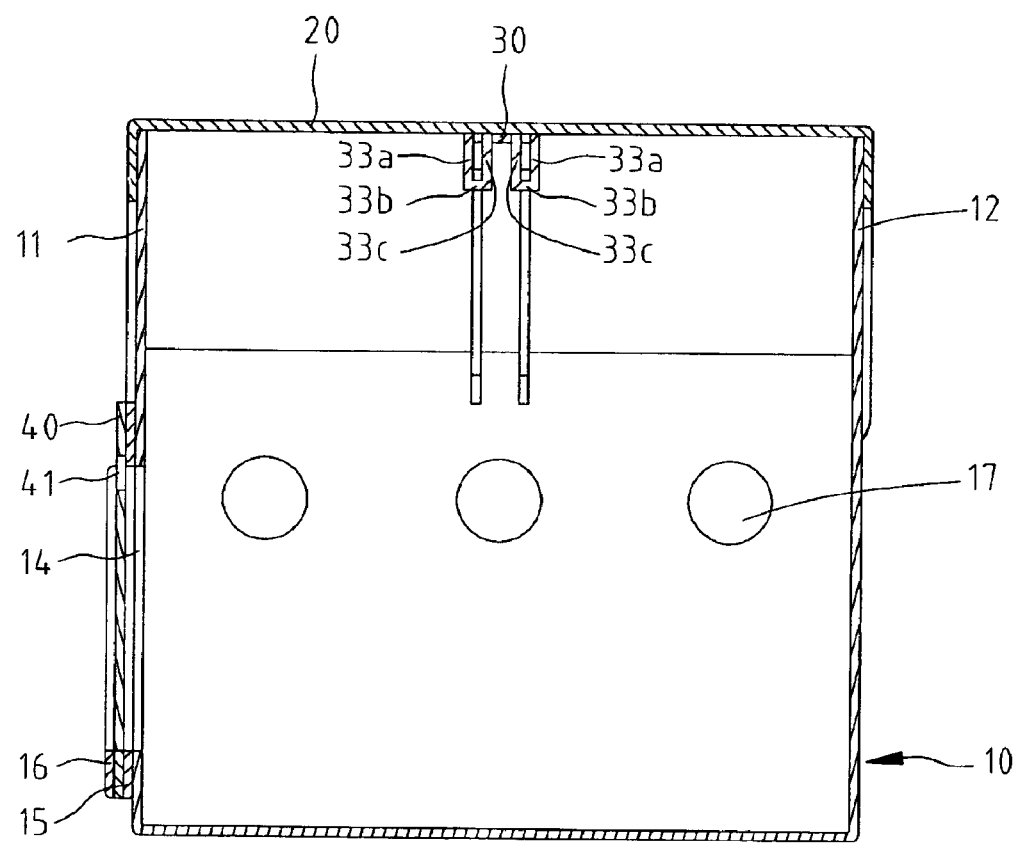
FIG. 8 is a cross-sectional view of the pet house of FIG. 6.
Figure 10:
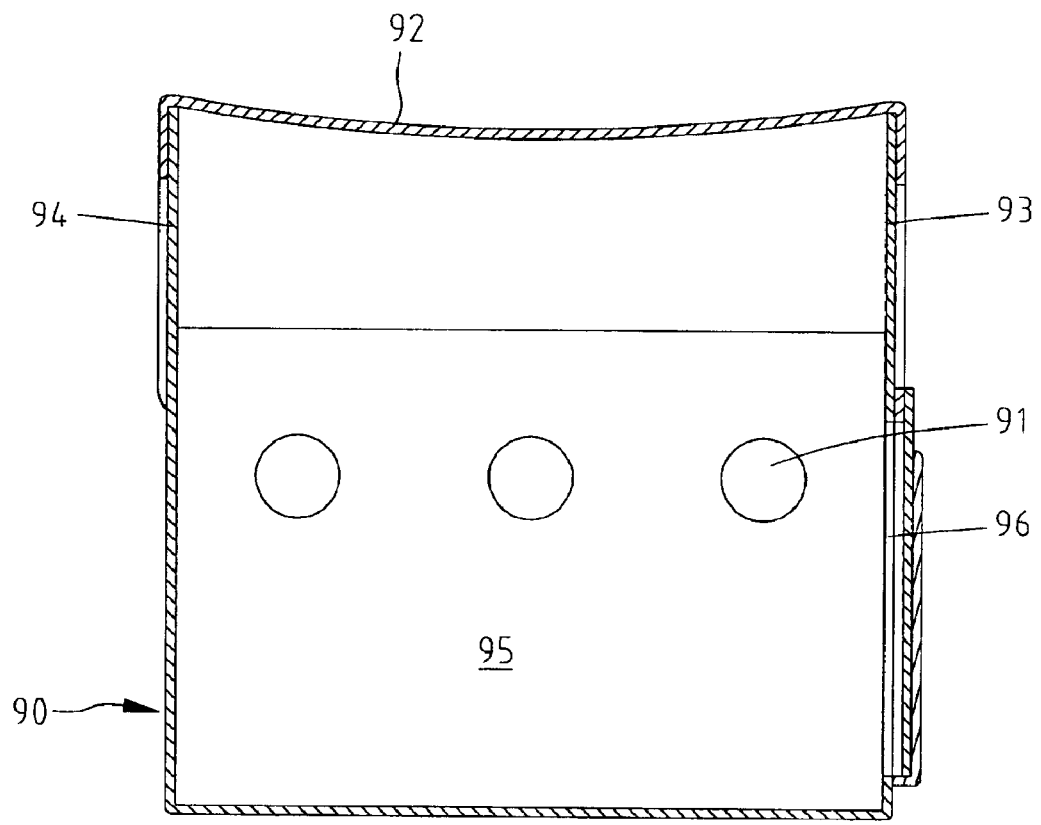
FIG. 10 is a perspective view of a pet house made of paper according to prior art.

FIGS. 7–9 show a pet house made of paper according to a third embodiment of the present invention. The third embodiment is identical to the first embodiment except for including a reinforcement device 30' instead of the reinforcement device 30.

FIG. 9 shows a paperboard of which the reinforcement device 30' is made. The paperboard includes a central rectangular strip 32' defining two slots 32a, two connectors 33' extending from two sides of the central rectangular strip 32' and two lateral rectangular strips 34' extending from the other sides of the central rectangular strip 32'. Each connector 33' includes a first portion 33a, a second portion 33b, a third portion 33c and a fourth portion 33d shaped as a tongue. Each lateral rectangular strip 34' includes two flanks 35' each defining a slit 36.

To form the reinforcement device 30', the connectors 33' are folded towards each other. The third portion 33c of each connector 33' is folded towards the first portion 33a of the same. The fourth portion 33d of each connector 33' is inserted in one slot 32a. The lateral rectangular strips 34' are folded towards each other until they contact the trapezoidal strips 33'. The flanks 35' of each lateral rectangular strip 34' are moved towards each other. An end of each flank 35' of each lateral rectangular strip 34' is put between and adhered to the first portion 33a and the third portion 33c of one connector 33'. Thus, the reinforcement device 30 is formed. One connector 33' and two flanks 35' make a rib 31' as shown in FIG. 7.

The present invention has been described via detailed illustration of three embodiments. Those skilled in the art can derive variations from the embodiments without departing from the scope of the present invention. Therefore, the embodiments shall not limit the scope of the present invention defined in the claims.

What is claimed is:

1. A pet house made of paper including:
    a house-shaped box including a front wall defining a door, a rear wall and two lateral walls, the front and rear walls both including an upper portion extending above the lateral walls;
    at least one reinforcement device mounted on the lateral walls; and
    a roof mounted on the upper portions of the front and rear walls and the reinforcement device wherein the roof includes two ribs attached thereto so as to enhance its rigidity.

2. The pet house according to claim 1 wherein the reinforcement device includes at least one rib wherein the rib defines a slit in each end for receiving one of the lateral walls, thus keeping the reinforcement device on the lateral walls.

3. The pet house according to claim 1 wherein the ribs are outside the box.

4. The pet house according to claim 3 including a spacer attached to the front wall around the door for keeping the shutter from one of the ribs, thus ensuring smooth operation of the shutter.

5. The pet house according to claim 1 wherein each of the lateral walls defines a slit for receiving an end of the rib, thus keeping the reinforcement device on the lateral walls.

6. The pet house according to claim 1 wherein the rib includes a connector and two strips connected with each other through the connector.

7. The pet house according to claim 6 wherein the connector is a trapezoidal strip.

8. The pet house according to claim 6 wherein the connector includes a first portion, a second portion extending from the first portion and a third portion extending from the second portion and in parallel to the first portion, and an end of each strip is put between and attached to the first and second portions of each connector.

* * * * *